United States Patent [19]

Maeda et al.

[11] Patent Number: 4,495,929
[45] Date of Patent: Jan. 29, 1985

[54] EXHAUST GAS RECIRCULATION SYSTEM FOR DIESEL ENGINES

[75] Inventors: Tooru Maeda; Tsunao Yajima, both of Hiroshima, Japan

[73] Assignee: Mazda Motor Corporation, Hiroshima, Japan

[21] Appl. No.: 349,706

[22] Filed: Feb. 18, 1982

[30] Foreign Application Priority Data

Feb. 19, 1981 [JP] Japan .................... 56/23722

[51] Int. Cl.³ ............................. F02M 25/06
[52] U.S. Cl. ........................ 123/569; 123/571
[58] Field of Search ................. 123/569, 571

[56] References Cited

U.S. PATENT DOCUMENTS

| | | | |
|---|---|---|---|
| 3,915,134 | 10/1975 | Young et al. | 123/569 |
| 4,325,347 | 4/1982 | Yamaguchi | 123/571 |
| 4,333,439 | 6/1982 | Muller et al. | 123/569 |
| 4,333,440 | 6/1982 | Eheim | 123/569 |
| 4,369,753 | 1/1983 | Sugiyama | 123/571 |

FOREIGN PATENT DOCUMENTS 137644  8/1982  Japan .................... 123/569

*Primary Examiner*—Wendell E. Burns
*Attorney, Agent, or Firm*—Fleit, Jacobson, Cohn & Price

[57] ABSTRACT

An exhaust gas recirculation system for diesel engines including an exhaust gas recirculation passage and a recirculation control valve for controlling the gas flow in the recirculation passage. A control circuit is provided for controlling the operation of the control valve. The control circuit receives an engine speed signal and a position signal which represents the angular position of the control lever in the fuel injection pump and closes the control valve to cut-off the exhaust gas recirculation when the engine speed signal becomes smaller than the position signal.

6 Claims, 7 Drawing Figures

F I G. 1
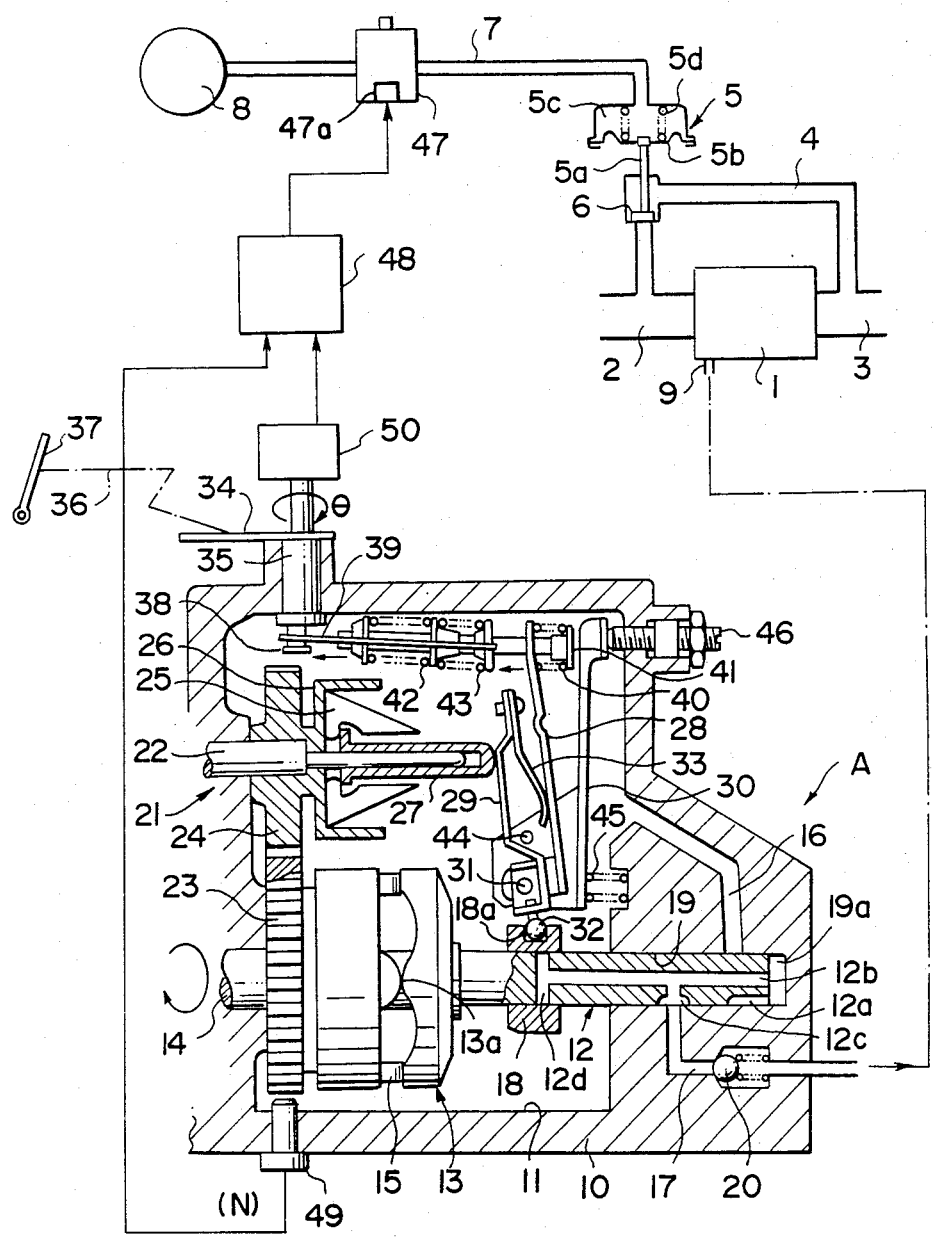

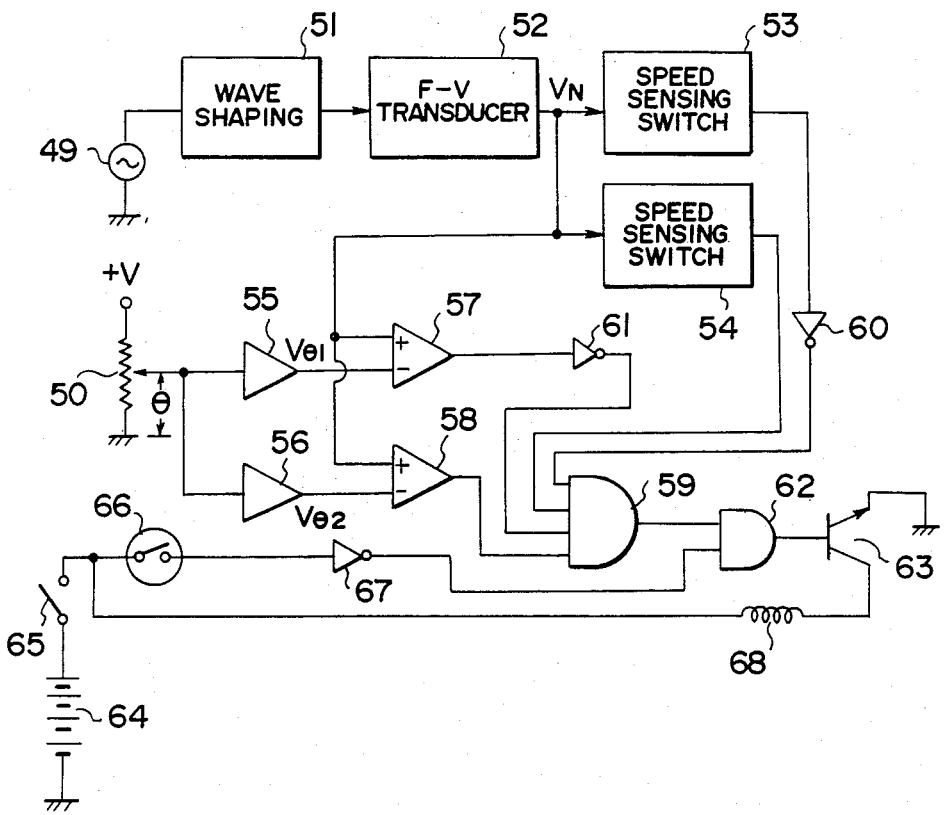
F I G. 2

EXHAUST GAS RECIRCULATION SYSTEM FOR DIESEL ENGINES

The present invention relates to diesel engines and more particularly to an exhaust gas recirculation system for diesel engines.

Hithertofore, it has been well known to provide diesel engines with an exhaust gas recirculation system including an exhaust gas recirculation passage having a recirculation control valve so that an appropriate amount of exhaust gas is returned to the intake system to thereby suppress production of nitrogen oxides. In these diesel engines having such an exhaust gas recirculation system, it is desired to control the recirculation control valve in accordance with the engine speed because an effective result cannot be attained by the exhaust gas recirculation under a low speed range and serious problems may be encountered in respect of durability and reliability under a high speed range. For that purpose, conventional exhaust gas recirculation systems include an engine speed sensor so as to control the recirculation control valve to thereby cut-off the exhaust gas recirculation below a lower speed limit and above a higher speed limit.

It is further desired in the exhaust gas recirculation system to control gas recirculation in accordance with the engine load because the amount of nitrogen oxides produced under a light load range is relatively small, whereas gas recirculation causes an insufficient output and production of smoke under a heavy load range. Thus, Japanese patent application 51-51680 filed on May 8, 1976 and disclosed for public inspection on Nov. 11, 1977 under the disclosure No. 52-134927 teaches the use of the angular position of the control lever of a fuel injection pump of a diesel engine for controlling the operation of the recirculation control valve. U.S. Pat. No. 4,157,081 issued on June 5, 1979 to J. Wake et. al. also discloses a similar concept. It should however be noted that the control lever position does not solely represent the engine load or the amount of fuel supply, but the amount of fuel supply under a certain control lever position decreases in response to an increase in the engine speed. Thus, where a control is made so that the gas recirculation is cut-off beyond a predetermined angle of the control lever position, there will be a possibility that the gas recirculation is carried out even in a full load condition with the engine speed below a certain value to thereby cause a decrease in the engine output and produce smoke in the exhaust system.

In order to eliminate the problem, the maximum fuel supply may be decreased to limit the full load engine output, however, that solution will cause an insufficient engine output. Alternatively, a control may be made such that the gas recirculation be carried out only under the fuel control lever position wherein the full load condition does not take place. However, in this solution, the exhaust gas recirculation is performed only in a limited range so that it would be possible to accomplish an adequate reduction of nitrogen oxides. In view of the problems, a proposal has been made that the fuel injection pump be provided with a limiting device to limit the peak value of fuel supply only when gas recirculation is to occur. However, even with this proposal, there still exists the problem of insufficient maximum engine output. Further, it would not be possible to accomplish desirable exhaust gas recirculation because the position of the fuel control lever of the fuel injection pump is not proportional to the amount of fuel supply.

It is therefore an object of the present invention to provide an exhaust gas recirculation system for a diesel engine in which exhaust gas recirculation can be performed in accordance with the amount of fuel supply.

Another object of the present invention is to provide an exhaust gas recirculation system for a diesel engine in which the exhaust gas recirculation is appropriately controlled in accordance with the position of the fuel control lever in the fuel injection pump and the engine speed.

A further object of the present invention is to provide an exhaust gas recirculation system which does not affect the maximum engine output.

According to the present invention, the above and other objects can be accomplished by a diesel engine comprising combustion chamber means, intake passage means leading to said combustion chamber means, fuel injection nozzle means, fuel injection pump means for providing a supply of fuel to said fuel injection nozzle means and including externally actuatable control lever means and engine speed responsive governor means which together determine amount of the fuel supply, exhaust passage means leading from said combustion chamber means, exhaust gas recirculation passage means extending between said exhaust and intake passage means for passing a part of the exhaust gas from said exhaust passage means to said intake passage means, control valve means provided in said recirculation passage means for controlling the exhaust gas which is to be passed from the exhaust passage means to said intake passage means, first sensing means for detecting the position of the control lever means and producing a lever position signal, second sensing means for detecting the engine speed and producing an engine speed signal, control means adapted to receive said lever position signal and said engine speed signal and acutate said control valve means to close said recirculation passage means in a range beyond a specific value of fuel supply which is determined in accordance with said signals.

In a preferable mode of the present invention, the control means includes transducing means which receives the lever position signal from the first sensing means and produces a cut-off signal which changes in response to a change in the lever position, comparator means provided in the control means to compare the cut-off signal with the engine speed signal and produce a valve actuating signal when the engine speed signal is smaller than the cut-off signal to thereby close the control valve means. According to the features of the present invention, when the engine speed decreases at a certain position of the control lever means beyond a predetermined value which is determined by the cut-off signal corresponding to the specific position of the control lever means, the exhaust gas recirculation control valve means is closed. Therefore, it is possible to cut-off the gas recirculation before the amount of fuel supply reaches the full load value.

In order to cut-off the exhaust gas recirculation under a low engine speed range irrespective of the position of the control lever means, the control means may include engine speed responsive switch means so that the control valve means is closed at an engine speed lower than a predetermined value. Similarly, the exhaust gas recirculation may be cut-off irrespective of the control lever position when the engine speed exceeds a second predetermined value.

In another mode of the present invention, the control means may include position switch means which is responsive to the control lever position so that the exhaust gas recirculation is cut-off when the control lever means is moved beyond a predetermined position in a direction of increasing fuel supply. The control means may further include second transducing means which receives the lever position signal from the first sensing means and produces a lower cut-off signal which is compared with the engine speed signal so that the control valve means is closed when the engine speed signal is larger than the lever cut-off signal.

The above and other objects and features of the present invention will become apparent from the following descriptions of preferred embodiments taking reference to the accompanying drawings, in which:

FIG. 1 is a schematic diagram showing an exhaust gas recirculation system in accordance with one embodiment of the present invention;

FIG. 2 is a diagram showing the circuit for controlling the exhaust gas recirculating valve;

Figure 3A:
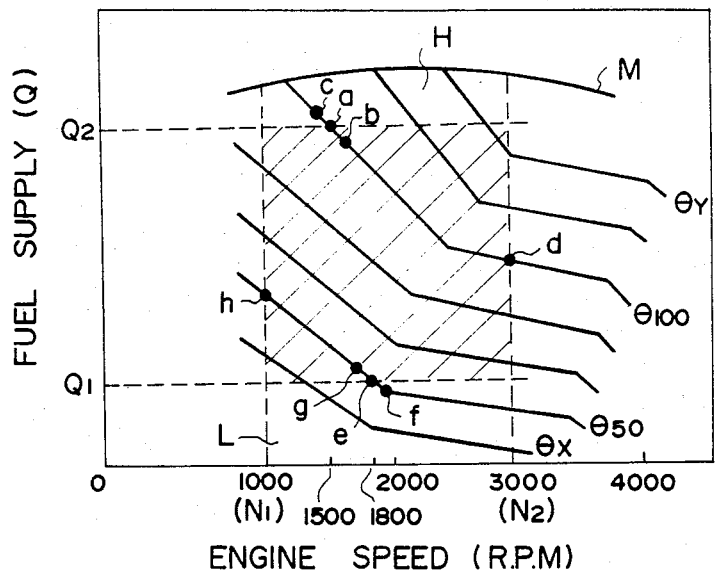
FIG. 3(A) is a diagram showing the engine operating range in which the exhaust gas is recirculated in accordance with one embodiment of the present invention.

Referring now to the drawings, particularly to FIG. 1, there is shown a diesel engine having a cylinder block 1 in which a combustion chamber is defined. The engine further includes an intake passage 2 and an exhaust passage 3 which are in communication with the combustion chamber in the cylinder block 1. Between the intake and exhaust passages 2 and 3, there is an exhaust gas recirculation passage 4 for recirculating a portion of the exhaust gas from the exhaust passage 3 to the intake passage 2. In the recirculation passage 4, there is provided a recirculation control valve 6 which is adapted to be actuated by a diaghragm type valve acutator 5. The valve actuator 5 includes a rod 5a which is connected at one end with the valve 6 and at the other end with a diaphragm 5b. The diaphragm 5b defines a suction pressure chamber 5c communicating through a suction pressure passage 7 with a vacuum pump 8. In the suction pressure chamber 5c, there is a compression spring 5d which biases the diaphragm 5b and therefore the valve 6 toward the closed position. In the suction pressure chamber 47a, there is a solenoid valve 47 which is energized by a signal supplied from a control circuit 48.

The combustion chamber is provided with a fuel injection nozzle 9 which is supplied with fuel from a fuel injection pump A. The fuel injection pump A includes a housing 10 having a pump chamber 11 defined therein. As well known in the art, the pump chamber 11 is supplied with fuel from a fuel reservoir (not shown). In the housing 10, there is disposed a plunger 12 which is received in a cylindrical bore 19, formed in the housing 10, for reciprocating axial movement. One end of the plunger 12 defines a chamber 19a in the bore 19 and the other end is projected in the pump chamber 11. At the end in the pump chamber 11, the plunger 12 is provided with a cam disc 13 which is formed at one end surface with cam profiles 13a which are the same in number as the cylinders of the engine. The cam disc 13 and the plunger 12 are rotated by a drive shaft 14 at a speed which is one-half of the engine speed. The housing 10 carries stationary rollers 15 which cooperate with the cam profiles 13a on the cam disc 13. Although not shown in the drawing, a spring is provided for biasing the cam disc 13 toward the rollers 15 so that as the cam disc 13 and the plunger 12 rotate they are axially reciprocated by a distance corresponding to the height of the cam profiles 13a.

The housing 10 is formed with an inlet port 16 which is opened at one end to the pump chamber 11 and at the other end to the bore 19. At its inner end, the plunger 12 is formed with an inlet slit 12a so that the chamber 19a is cyclically opened to the port 16 as the plunger 12 reciprocates. The housing 10 is further formed with outlet passages 17 each of which is opened at one end to the bore 19 and connected at the other end through a check valve 20 with the fuel injection nozzle 9 of an associated cylinder. The plunger 12 is further formed with an axial passage 12b which is opened at one end to the chamber 19a. At the intermediate portion of the passage 12b, the plunger 12 is formed with a distributing slit 12c which is adapted to be communicated with one of the outlet passages 17. The other end of the passage 12b is opened through a diametrical passage or cut-off port 12d to the peripheral surface of the plunger 12.

On the plunger 12, there is a cut-off sleeve 18 which is slidable with respect to the plunger 12. The cut-off sleeve 18 is located so that it normally covers the cut-off port 12d and determines the end of the pumping stroke by uncovering the port 12d as the plunger 12 reciprocates. As well known in the art, as the plunger 12 moves leftwards in FIG. 1, the inlet slit 12c is aligned with the port 16 so that the fuel in the pump chamber 11 is drawn into the chamber 19a and, in the succeeding rightward movement, the plunger 12 forces the fuel in the chamber 19a into the passage 12b. In this course of operation, the distributing slit 12c is aligned with the outlet passage 17 so that the fuel is forced under pressure through the passage 17 and the check valve 20 to the fuel injection nozzle 9. As the plunger 12 moves rightwards, the cut-off port 12d in the plunger 12 is uncovered by being moved out of the cut-off sleeve 18 so that the fuel under pressure in the passage 12b is discharged into the chamber 11 to terminate the injection of fuel. The plunger 12 reciprocates a number of times corresponding to the number of cylinders in the engine during a full rotation thereof so that the passages 17 are sequentially supplied with fuel to discharge it into the respective cylinders. The amount of fuel injected into each cylinder is determined by the position of the cut-off sleeve 18 which governs the timing wherein the fuel injection is terminated.

In order to determine the position of the cut-off sleeve 18, there is provided a control lever 34 which is secured at one end to a shaft 35 mounted rotatably on the housing 10. The control lever 34 is adapted to be manually operated for example by a foot-pedal 37 of an automobile through a linkage 36. The shaft 35 has an eccentric pin 38 which is engaged with one end of a yoke 39. The yoke has a governor spring 42 and a partial load spring 43 which connect the yoke 39 with an idle pin 41 that is engaged through an idle spring 40 with one end of a tension lever 28. In the chamber 11, there is provided a collector lever 30 which is pivotably mounted by a pin 44 on the housing 10 and has a pin 31 for pivotably mounting the aforementioned tension lever 28 and a start lever 29. The collector lever 30 is spring biased clockwise by a spring 45 and the housing 10 is provided with an adjustable stop screw 46 for limiting the clockwise movement of the lever 30.

The start lever 29 has at its lower end a ballheaded pin 32 which is engaged with a recess 18a formed in the cut-off sleeve 18. The start lever 29 is provided at the upper end with a start spring 33 which is engaged with the tension lever 28 to bias it clockwise. The start lever 29 is engaged with a centrifugal governor 21. The governer 21 includes a governor shaft 22 rotatably carrying a weight holder 26 on which centrifugal weights 25 are pivotably mounted. On the inner end of the governor shaft 22, there is mounted a governor sleeve 27 which is rotatable and axially slidable with respect to the governor shaft 22. The governor sleeve 27 is engaged with the governor weights 25 so as to be forced against the start lever 29. The weight holder 26 is formed with a gear 24 which is engaged with a gear 23 on the drive shaft 14. With the mechanism described above, the amount of fuel supply is controlled in accordance with the engine speed and the angular position $\theta$ of the control lever 34 as shown in FIG. 3(A).

The control lever 34 is connected with a position sensor 50 which produces a position signal corresponding to the angular position of the control lever 34. The position signal from the sensor 50 is applied to the control circuit 48. The housing 10 carries an engine speed sensor 49 in the vicinity of the gear 23. The sensor 49 produces a pulsating speed signal corresponding to the engine speed. The speed signal is also applied to the control circuit 48.

Figure 3B:
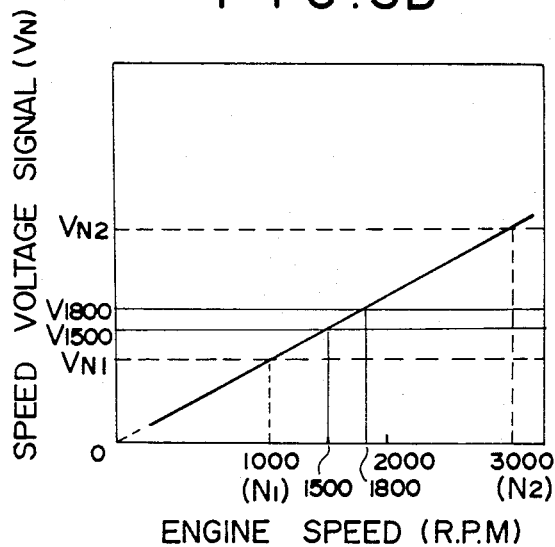
FIG. 3(B) is a diagram showing the engine speed analog signal as produced by the engine speed signal transducer.
Figure 3C:
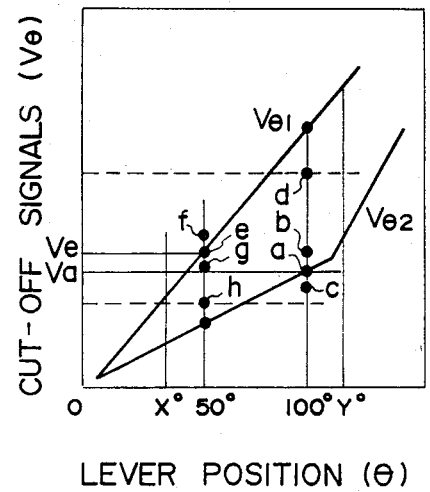
FIG. 3(C) is a diagram showing the cut-off signals which are dependent on the position of the control lever in the fuel injection pump.

Referring now to FIG. 2 which shows details of the control circuit 48, the output of the engine speed sensor 49 is applied to a wave shaping circuit 51 having an output connected with a frequency-voltage transducer 52 wherein the pulsating speed signal is converted into an analog voltage signal $V_N$ as shown in FIG. 3(B). The signal $V_N$ is then applied to a first speed responsive switch 53 which opens at an engine speed greater than a first predetermined value such as 1000 rpm. The signal $V_N$ is also applied to a second speed responsive switch 54 which opens at an engine speed greater than a second predetermined value that is higher than the first value, for example, 3000 rpm.

The output of the position sensor 50 is applied to amplifiers 55 and 56 which produce analog voltage signals $V_{\theta 1}$ and $V_{\theta 2}$, respectively, in accordance with the angular position $\theta$ of the control lever 34. The output $V_{\theta 1}$ of the amplifier 55 is applied to a comparator 57 whereas the output $V_{\theta 2}$ of the amplifier 56 is applied to a comparator 58. The output $V_N$ of the transducer 52 is applied to both the comparators 57 and 58 so that the speed signal $V_N$ is compared with the position signals $V_{\theta 1}$ and $V_{\theta 2}$. The comparator 57 produces an output of high level when the speed signal $V_N$ is larger than the position signal $V_{\theta 1}$. Similarly, the comparator 58 produces an output of high level when the speed signal $V_N$ is larger than the position signal $V_{\theta 2}$.

The output of the comparator 57 is applied through an inverter 61 to an AND circuit 59 whereas the output of the comparator 58 is applied directly to the AND circuit 59. Further, the output of the speed responsive switch 53 is applied through an inverter 60 to the AND circuit 59, whereas the output of the speed responsive switch 54 is applied directly to the AND circuit 59. The output of the AND circuit 59 is connected with an AND circuit 62 which has an output connected with a base of a power transistor 63. An electric power source is connected through a main switch 65 with an engine temperature switch 66 which opens under an engine temperature higher than a predetermined value. The switch 66 is further connected through an inverter 67 with the AND circuit 62. The solenoid 68 of the solenoid valve 47a is connected on one hand through the main switch 65 with the power source 64 and on the other hand with the collector of the NPN type power transistor 63.

In operation with a certain angular position, for example $\theta_{100}$ in FIG. 3(A), of the control lever 34, the control circuit 48 is adjusted so that when the engine is operated under a condition shown by a point a, namely, with a speed of for example 1500 rpm, the speed signal $V_N$ is equal to the second position signal $V_{\theta 2}$. If the engine speed increases with the control lever position maintained as it is, the engine operating condition is shifted to, for example, a point b in FIG. 3(A) and the value of the speed signal $V_N$ is increased. Thus, a signal of high level is applied from the comparator 58 to the AND circuit 59. At this instance, the speed signal $V_N$ is smaller than the first position signal $V_{\theta 1}$ so that a low level signal is applied from the comparator 57 to the inverter 61 which then applies a high level signal to the AND circuit 59. Since the AND circuit 59 is further applied with high level signals from the switches 53 and 54 as long as the engine speed is between the first and second speed limits $N_1$ and $N_2$, the AND circuit 59 produces a high level signal which is applied to the AND circuit 62. If the engine temperature is above the predetermined value, the AND circuit 62 is then turned on to produce a high level signal which is then applied to the transistor 63 to turn it on. Thus, the solenoid 68 is energized to open the valve 47a to thereby allow the exhaust gas to pass to the intake passage 7.

If the engine speed decreases with the control lever position maintained as it is, the engine operating condition is shifted to a point shown, for example, by c in FIG. 3(A), and the speed signal $V_N$ becomes smaller than the second position signal so that a low level signal is applied from the comparator 58 to the AND circuit 59. Thus, the output of the AND circuit 59 and that of the AND circuit 62 are at a low level and the transistor 63 is turned off to de-energize the solenoid 68. Therefore, exhaust gas recirculation is terminated before the fuel supply is increased to the full load value as shown by a curve M. When the engine speed is increased to the upper limit $N_2$ as shown by a point d in FIG. 3(A), the switch 54 is turned off so that the AND circuit 59 produces a low level signal. Thus, the transistor 63 is turned off to cut-off the exhaust gas recirculation.

Supposing that the angular position of the control lever 34 is changed to, for example, a value $\theta_{50}$, the first position signal $V_{\theta 1}$ is equal to the speed signal $V_N$ with an engine speed of for example 1800 rpm as shown by a point e. As the engine speed increases to, for example, 1900 rpm as shown by a point f, the speed signal $V_N$ becomes larger than the first position signal $V_{\theta 1}$ so that the exhaust gas recirculation is terminated. When the engine speed is decreased, however, to, for example, 1600 rpm as shown by a point g, the exhaust gas recirculation is continued since the speed signal $V_N$ is smaller than the first position signal $V_{\theta 1}$. If the engine speed further decreases beyond the lower speed limit as shown by a point h, the gas recirculation is cut-off because the signal applied from the switch 53 through the inverter 60 is at a low level. Thus, in the above described embodiment, the exhaust gas recirculation is performed in the operating range as shown by shadows in FIG. 3(A). It is important to note that although the angular position of the control lever 34 is detected as one of the control factors, it is possible to cut-off the exhaust gas recirculation at full load operating range by taking the engine speed as the other control factor.

Figure 4:
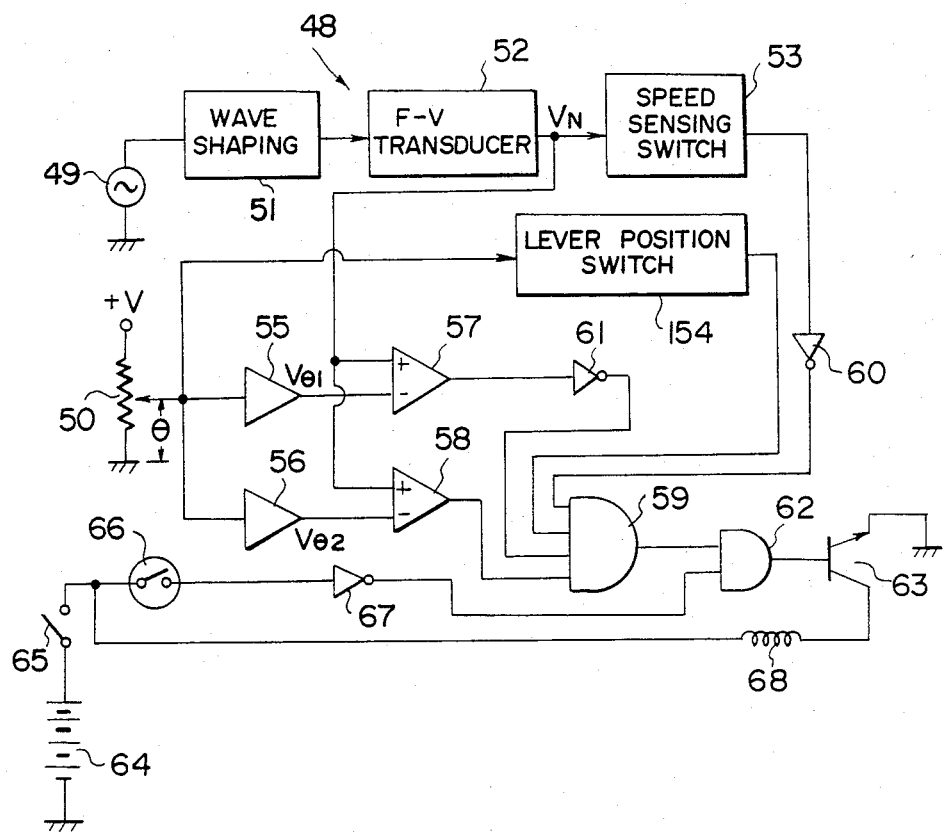
FIG. 4 is a diagram of the control circuit in accordance with another embodiment of the present invention; and, FIG. 5 is a diagram showing the engine operating range in which exhaust gas recirculation is carried out in the embodiment shown in FIG. 4.
Figure 5:
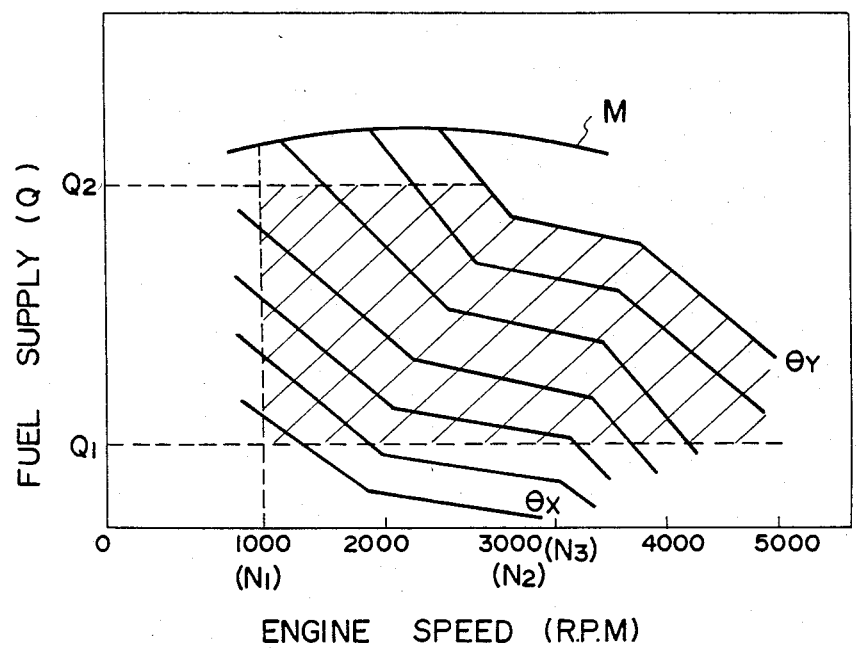

Referring now to FIG. 4, the control circuit 48 shown therein includes a position sensing switch 154 which replaces the speed responsive switch 54 in the previous embodiment. The switch 54 is actuated in accordance with the angular position of the control lever 34 so that it is opened when the lever 34 is rotated beyond the angle $\theta_\gamma$ as shown in FIG. 5. In this embodiment, the exhaust gas recirculation is carried out in the operating range shown by shadow lines in FIG. 5.

The invention has thus been shown and described with reference to specific embodiments, however, it should be noted that the invention is in no way limited to the details of the illustrated arrangements but changes and modifications may be made without departing from the scope of the appended claims.

We claim:

1. A diesel engine comprising combustion chamber means, intake passage means leading to said combustion chamber means, fuel injection nozzle means, fuel injection pump means for providing a supply of fuel to said fuel injection nozzle means said fuel injection pump means including fuel displacing plunger means of variable effective stroke and fuel amount adjusting means for determining the effective stroke of said plunger means, said adjusting means including an adjusting member for adjusting the effective stroke of the plunger means, externally actuatable control lever means adapted to be acutated by an engine control member for forcing the adjusting member in a direction of increasing fuel supply as the engine control member is moved in direction of increasing engine output and engine speed responsive governor means for forcing the adjusting member in a direction of decreasing the fuel supply as the engine speed increases, exhaust passage means leading from said combustion chamber means, exhaust gas recirculation passage means extending between said exhaust and intake passage means for passing a part of the exhaust gas from said exhaust passage means to said intake passage means, control valve means provided in said recirculation passage means for controlling the exhaust gas which is to be passed from the exhaust passage means to said intake passage means, first sensing means for detection the position of the control lever means and producing a lever position signal, second sensing means for detecting the engine speed and producing an engine speed signal, control means adapted to receive said lever position signal and said engine speed signal and actuate said control valve means to close said recirculation passage means in a range beyond a specific value of fuel supply which is determined in accordance with said signals, said control means including transducer means which receives the control lever position signal from the first sensing means and produces a cut-off signal which changes in response to a change in the control lever position so that it becomes equal to the engine speed signal at a predetermined amount of fuel supply which is determined by said adjusting member, comparator means provided in said control means to compare the cut-off signal with the engine speed signal and to produce a valve actuating signal when the engine speed signal is smaller than the cut-off signal to thereby close the control valve means.

2. A diesel engine in accordance with claim 1 in which said control means further includes engine speed responsive switch means for closing the control valve means at an engine speed below a predetermined value.

3. A diesel engine in accordance with claim 1 in which said control means includes engine speed responsive switch means for closing the control valve means at an engine speed above a predetermined value.

4. A diesel engine in accordance with claim 1 in which said control means further includes first engine speed responsive switch means for closing the control valve means at an engine speed below a first predetermined value and second engine speed responsive switch means for closing the control valve means at an engine speed above a second predetermined value which is higher than the first predetermined value.

5. A diesel engine in accordance with claim 1 in which said control means includes control lever position responsive switch means for closing said control valve means beyond a predetermined position of the control lever means.

6. A diesel engine in accordance with claim 1 in which said control means includes transducing means which receives the lever position signal from the first sensing means and producing a first cut-off signal and a second cut-off signal which is smaller than said first cut-off signal, comparator means being provided in the control means to compare the first and second cut-off signals with the engine speed signal and produce a valve actuating signal unless the engine speed signal is between the first and second cut-off signals to thereby close the control valve means.

* * * * *